US011826962B2

(12) United States Patent
Tsunoya

(10) Patent No.: US 11,826,962 B2
(45) Date of Patent: Nov. 28, 2023

(54) THREE-DIMENSIONAL SHAPING APPARATUS

(71) Applicant: SEIKO EPSON CORPORATION, Tokyo (JP)

(72) Inventor: Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 17/557,722

(22) Filed: Dec. 21, 2021

(65) Prior Publication Data

US 2022/0203622 A1 Jun. 30, 2022

(30) Foreign Application Priority Data

Dec. 24, 2020 (JP) ................................ 2020-214758

(51) Int. Cl.

*B29C 67/00* (2017.01)
*B29C 64/393* (2017.01)
*B33Y 50/02* (2015.01)
*B33Y 30/00* (2015.01)

(52) U.S. Cl.

CPC ............ *B29C 64/393* (2017.08); *B33Y 30/00* (2014.12); *B33Y 50/02* (2014.12)

(58) Field of Classification Search

CPC ....... B29C 64/393; B33Y 10/00; B33Y 30/00; B33Y 50/00; B33Y 50/02

See application file for complete search history.

(56) References Cited

U.S. PATENT DOCUMENTS

2017/0334137 A1 11/2017 Nystrom et al.
2018/0297290 A1* 10/2018 Eyal ...................... B29C 64/209
2019/0263066 A1 8/2019 Nystrom et al.

FOREIGN PATENT DOCUMENTS

CN 107379517 11/2017
CN 111660555 9/2020
JP 2005-335380 A 12/2005
JP 2018-086829 6/2018

* cited by examiner

*Primary Examiner* — Ryan M Ochylski
(74) *Attorney, Agent, or Firm* — WORKMAN NYDEGGER

(57) ABSTRACT

A three-dimensional shaping apparatus shapes a first shaped article by ejecting a material from an ejection section, forms a first portion of a second shaped article by adjusting an output of a temperature adjusting section while measuring a temperature of the first shaped article by a temperature sensor so that a viscosity of the first shaped article calculated based on the temperature of the first shaped article measured by the temperature sensor and first relational data representing a relationship between a temperature and a viscosity of the material becomes a predetermined viscosity or less, and ejecting the material from the ejection section, and forms a second portion that is a portion adjacent to the first portion of the second shaped article by ejecting the material from the ejection section while adjusting a temperature of the first portion by the temperature adjusting section with the adjusted output.

6 Claims, 11 Drawing Sheets

START THREE-DIMENSIONAL SHAPING PROCESS
START PLASTICIZATION OF MATERIAL — S210
TURN ON TEMPERATURE ADJUSTING SECTION — S220
SHAPE FIRST PORTION OF N-TH LAYER OF SHAPED ARTICLE — S230
MEASURE TEMPERATURE OF FIRST PORTION OF N-TH LAYER — S240
IS VISCOSITY PREDETERMINED VALUE OR LESS? — S250
NO → INCREASE OUTPUT OF TEMPERATURE ADJUSTING SECTION — S255
YES → SHAPE SECOND PORTION OF N-TH LAYER OF SHAPED ARTICLE — S270
IS SHAPING OF ALL LAYERS COMPLETED? — S280
NO / YES
END THREE-DIMENSIONAL SHAPING PROCESS

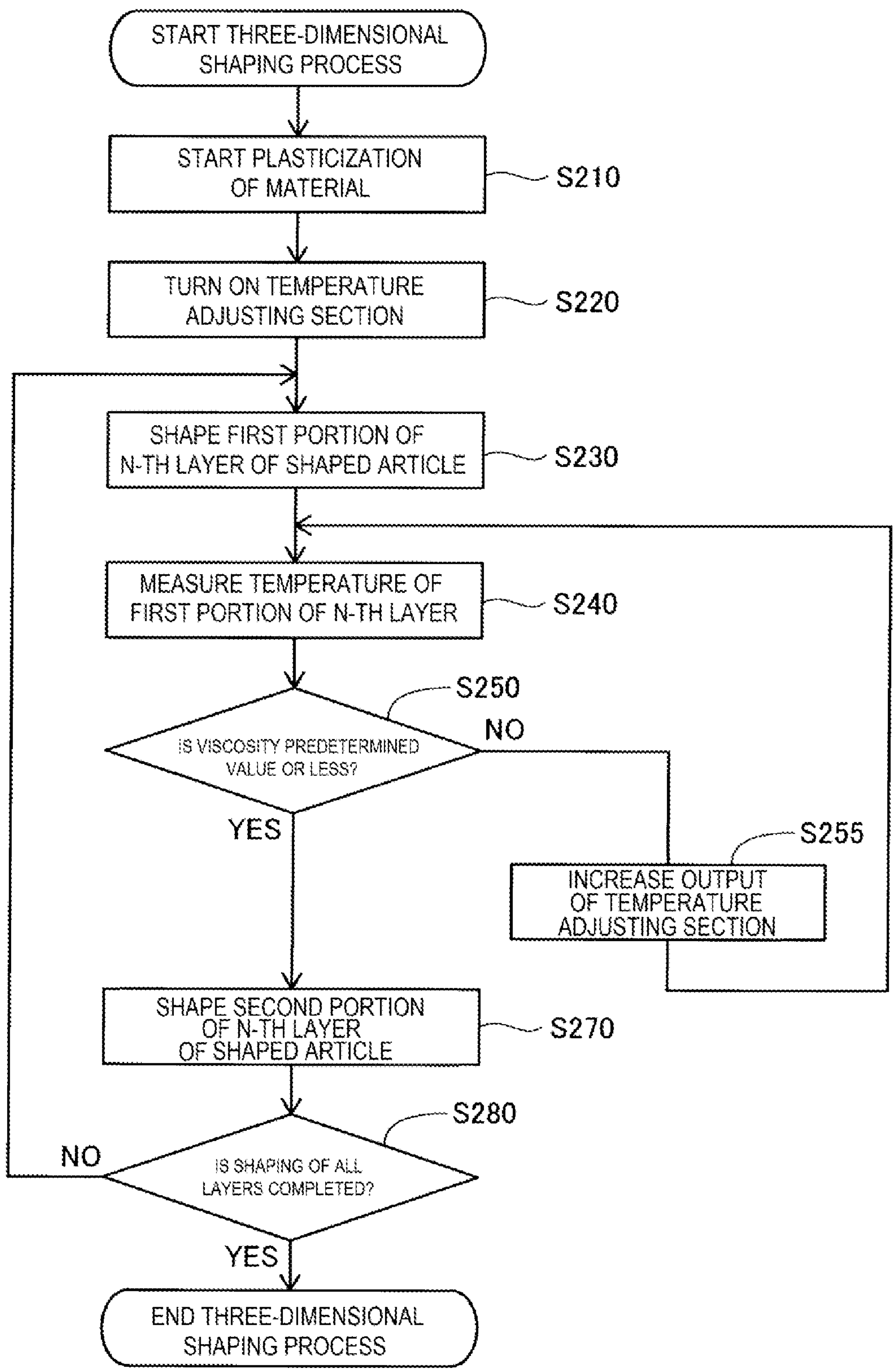
FIG. 12
START THREE-DIMENSIONAL SHAPING PROCESS
START PLASTICIZATION OF MATERIAL
S210
TURN ON TEMPERATURE ADJUSTING SECTION
S220
SHAPE FIRST PORTION OF N-TH LAYER OF SHAPED ARTICLE
S230
MEASURE TEMPERATURE OF FIRST PORTION OF N-TH LAYER
S240
S250
IS VISCOSITY PREDETERMINED VALUE OR LESS?
NO
YES
S255
INCREASE OUTPUT OF TEMPERATURE ADJUSTING SECTION
SHAPE SECOND PORTION OF N-TH LAYER OF SHAPED ARTICLE
S270
S280
NO
IS SHAPING OF ALL LAYERS COMPLETED?
YES
END THREE-DIMENSIONAL SHAPING PROCESS

THREE-DIMENSIONAL SHAPING APPARATUS

The present application is based on, and claims priority from JP Application Serial Number 2020-214758, filed Dec. 24, 2020, the disclosure of which is hereby incorporated by reference herein in its entirety.

BACKGROUND

1. Technical Field

The present disclosure relates to a three-dimensional shaping apparatus.

2. Related Art

JP-A-2005-335380 (Patent Document 1) discloses an apparatus that stacks a molten resin in multiple stages while extruding the molten resin. In order to enhance a welding strength between layers, this apparatus forms a layer by extruding the molten resin from an ejection unit on a layer of the preceding stage heated by a heating unit.

In order to shape a three-dimensional shaped article with high dimensional accuracy, the thickness of the layer is preferably thin. When the thickness of the layer is reduced, the heat capacity of the layer decreases, and therefore, the layer is cooled and is easily hardened. Even if a lower layer is heated when shaping an upper layer of layers vertically adjacent to each other as described in the above document, a portion of the upper layer may be cooled and hardened during shaping of the upper layer. Therefore, when shaping a portion adjacent to the hardened portion, a nozzle comes in contact with the hardened portion and the shape of the three-dimensional shaped article may collapse.

SUMMARY

According to a first aspect of the present disclosure, a three-dimensional shaping apparatus is provided. The three-dimensional shaping apparatus includes a stage, an ejection section that ejects a molten material toward the stage, a position changing section that changes a relative position of the stage and the ejection section, a temperature adjusting section that adjusts a temperature of the material ejected to the stage, a temperature sensor that measures the temperature of the material ejected to the stage, a storage section that stores first relational data representing a relationship between the temperature of the material and a viscosity of the material, and a control unit that controls the ejection section, the position changing section, and the temperature adjusting section so as to form a first shaped article and a second shaped article on the stage. The control unit executes first control for shaping the first shaped article by ejecting the material from the ejection section, second control for adjusting an output of the temperature adjusting section while measuring a temperature of the first shaped article by the temperature sensor so that a viscosity of the first shaped article calculated based on the temperature of the first shaped article measured by the temperature sensor and the first relational data becomes a predetermined viscosity or less, third control for forming a first portion of the second shaped article by ejecting the material from the ejection section, and fourth control for forming a second portion that is a portion adjacent to the first portion of the second shaped article by ejecting the material from the ejection section while adjusting a temperature of the first portion by the temperature adjusting section with the output adjusted in the second control.

According to a second aspect of the present disclosure, a three-dimensional shaping apparatus is provided. The three-dimensional shaping apparatus includes a stage, an ejection section that ejects a molten material toward the stage, a position changing section that changes a relative position of the stage and the ejection section, a temperature adjusting section that adjusts a temperature of the material ejected to the stage, a temperature sensor that measures the temperature of the material ejected to the stage, a storage section that stores first relational data representing a relationship between the temperature of the material and a viscosity of the material, and a control unit that controls the ejection section, the position changing section, and the temperature adjusting section so as to form a shaped article on the stage. The control unit executes first control for forming a first portion of the shaped article by ejecting the material from the ejection section, second control for adjusting an output of the temperature adjusting section while measuring a temperature of the first portion by the temperature sensor so that a viscosity of the first portion calculated based on the temperature of the first portion measured by the temperature sensor and the first relational data becomes a predetermined viscosity or less, and third control for forming a second portion that is a portion adjacent to the first portion of the shaped article by ejecting the material from the ejection section while adjusting the temperature of the first portion by the temperature adjusting section with the output adjusted in the second control.

BRIEF DESCRIPTION OF THE DRAWINGS

FIG. 12 is a flowchart showing the contents of a three-dimensional shaping process of a second embodiment.

DESCRIPTION OF EXEMPLARY EMBODIMENTS

A. First Embodiment

Figure 1:
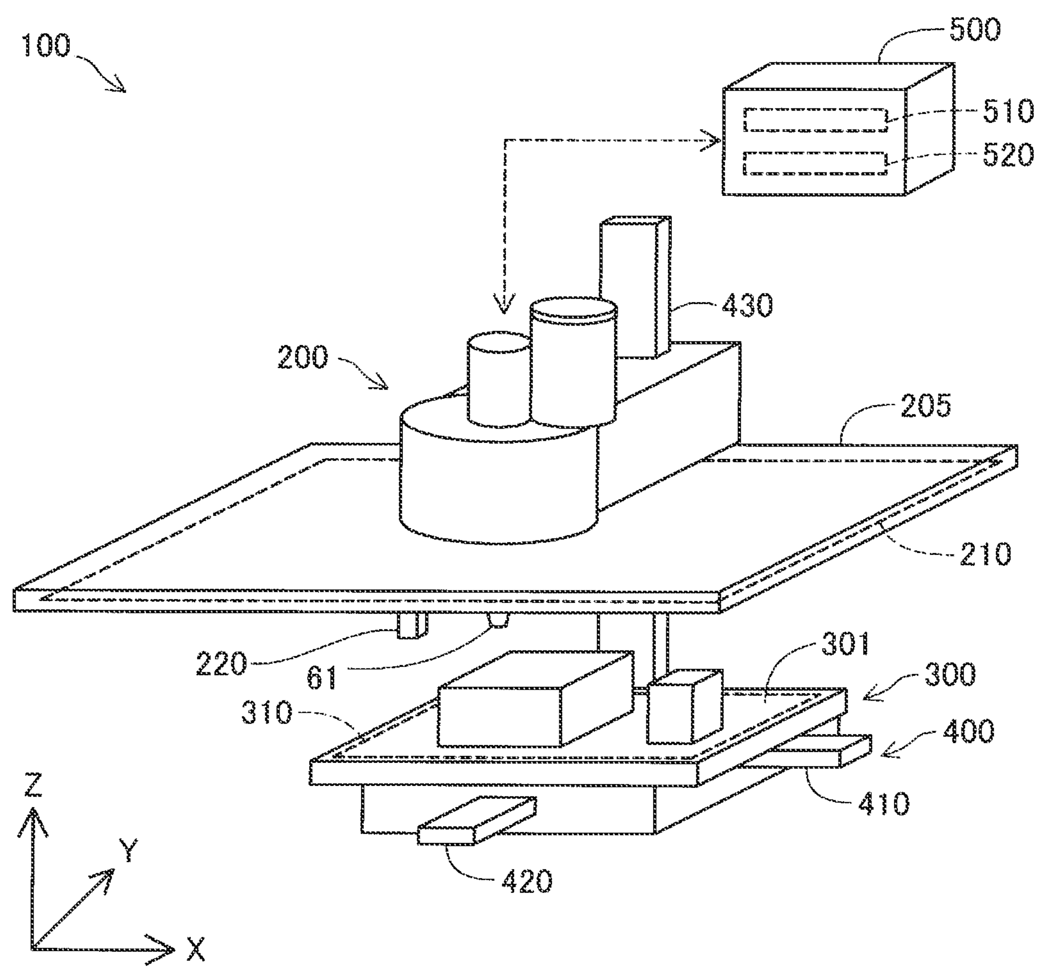
FIG. 1 is a perspective view showing a schematic configuration of a three-dimensional shaping apparatus of a first embodiment.
Figure 2:
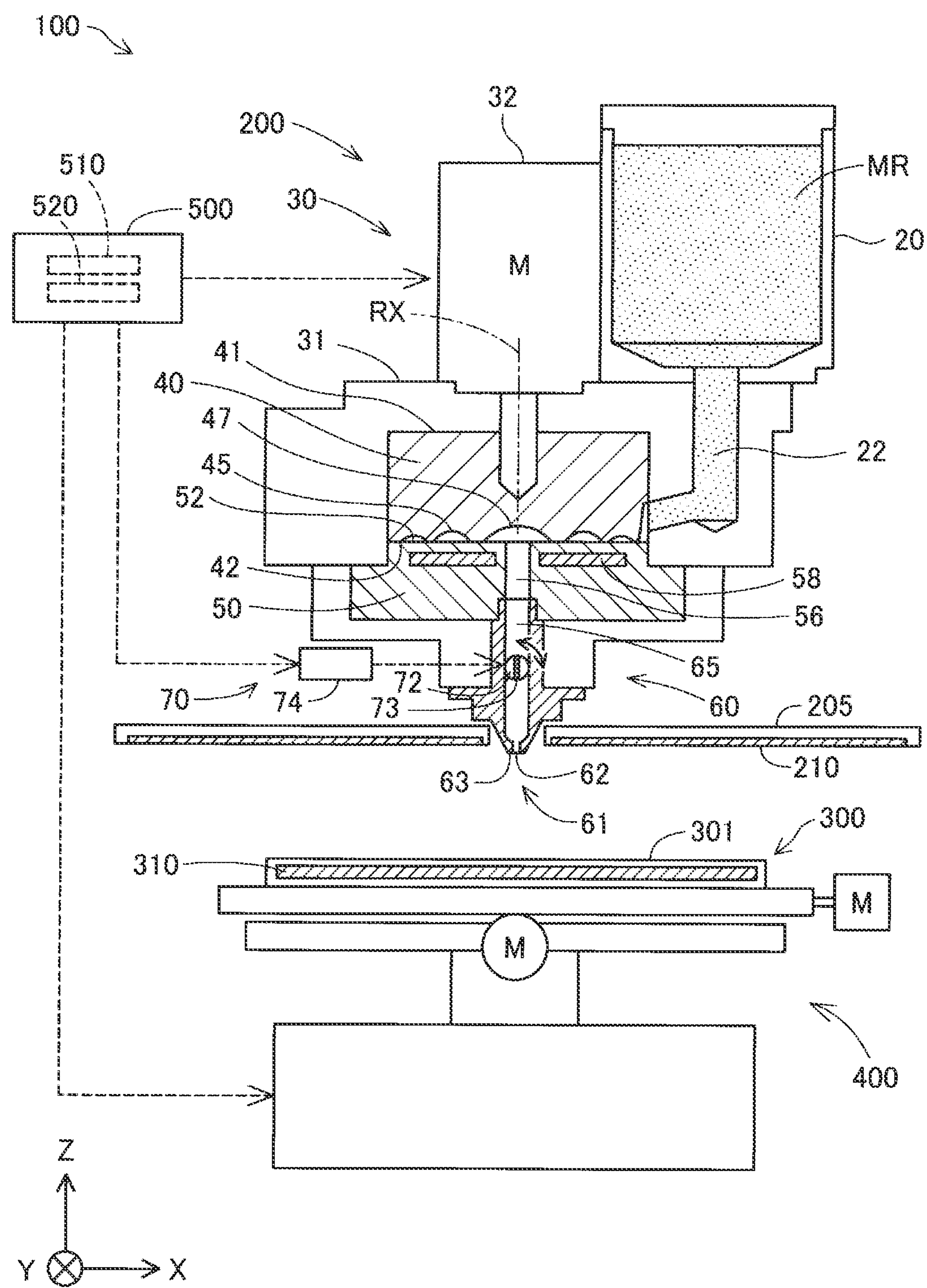
FIG. 2 is a cross-sectional view showing a schematic configuration of the three-dimensional shaping apparatus of the first embodiment.

FIG. 1 is a perspective view showing a schematic configuration of a three-dimensional shaping apparatus 100 according to a first embodiment. FIG. 2 is a cross-sectional view showing a schematic configuration of the three-dimensional shaping apparatus 100 according to the first embodiment. In FIGS. 1 and 2, arrows indicating X, Y, and Z directions orthogonal to one another are illustrated. The X direction and Y direction are directions parallel to a horizontal plane, and the Z direction is a direction opposite to the gravity direction. Also in other drawings, arrows indicating the X, Y, and Z directions are illustrated as appropriate so that the illustrated directions correspond to those in FIG. 1 and FIG. 2. In the following description, when the direction is specified, the positive direction that is a direction indicated by the arrow is denoted by "+", and the negative direction that is a direction opposite to the direction indicated by the arrow is denoted by "−", and the plus and minus signs are used together with the indication of the direction.

As shown in FIG. 1, in this embodiment, the three-dimensional shaping apparatus 100 includes a shaping section 200, a temperature adjusting section 210, a temperature sensor 220, a stage 300, a position changing section 400, and a control unit 500. The three-dimensional shaping apparatus 100 stacks a shaping material on the stage 300 and forms a first shaped article OB1 and a second shaped article OB2 each having a three-dimensional shape by changing the relative position of a nozzle 61 provided in the shaping section 200 and the stage 300 through the position changing section 400 while ejecting the shaping material toward the stage 300 from the nozzle 61 under the control of the control unit 500.

As shown in FIG. 2, the shaping section 200 includes a material supply section 20 that is a supply source of a material MR, a plasticizing section 30 that plasticizes the material MR to form a shaping material, and an ejection section 60 having the nozzle 61. The "plasticizing" means melting by applying heat to a material having thermoplasticity. The "melting" not only means converting a material having thermoplasticity to a liquid state by heating to a temperature equal to or higher than the melting point, but also means softening a material having thermoplasticity by heating to a temperature equal to or higher than the glass transition point so as to exhibit fluidity.

The material supply section 20 supplies the material MR for forming a shaping material to the plasticizing section 30. In this embodiment, the material supply section 20 is constituted by a hopper that stores the material MR. A discharge port is provided below the material supply section 20, and the discharge port is coupled to the plasticizing section 30 through a supply channel 22. In this embodiment, as the material MR, an ABS resin formed in a pallet shape is used.

The plasticizing section 30 plasticizes the material MR supplied from the material supply section 20 through the supply channel 22 to form a shaping material and supplies the shaping material to the ejection section 60. The plasticizing section 30 includes a screw case 31, a drive motor 32, a flat screw 40, a barrel 50, and a plasticizing heater 58.

The screw case 31 is a housing for housing the flat screw 40. To a lower end portion of the screw case 31, the barrel 50 is fixed, and the flat screw 40 is housed in a space surrounded by the screw case 31 and the barrel 50. To an upper face of the screw case 31, the drive motor 32 is fixed.

The flat screw 40 has a substantially columnar shape whose height in a direction along its central axis RX is smaller than the diameter. The flat screw 40 is placed in the screw case 31 so that the central axis RX is parallel to the Z direction. The flat screw 40 has a grooved face 42 having a groove portion 45 formed therein in the lower end portion opposed to the barrel 50. In the flat screw 40, the drive motor 32 is coupled to an upper end portion at the opposite side to the grooved face 42. The flat screw 40 is rotated around the central axis RX in the screw case 31 by a torque generated by the drive motor 32. The drive motor 32 is driven under the control of the control unit 500.

Figure 3:
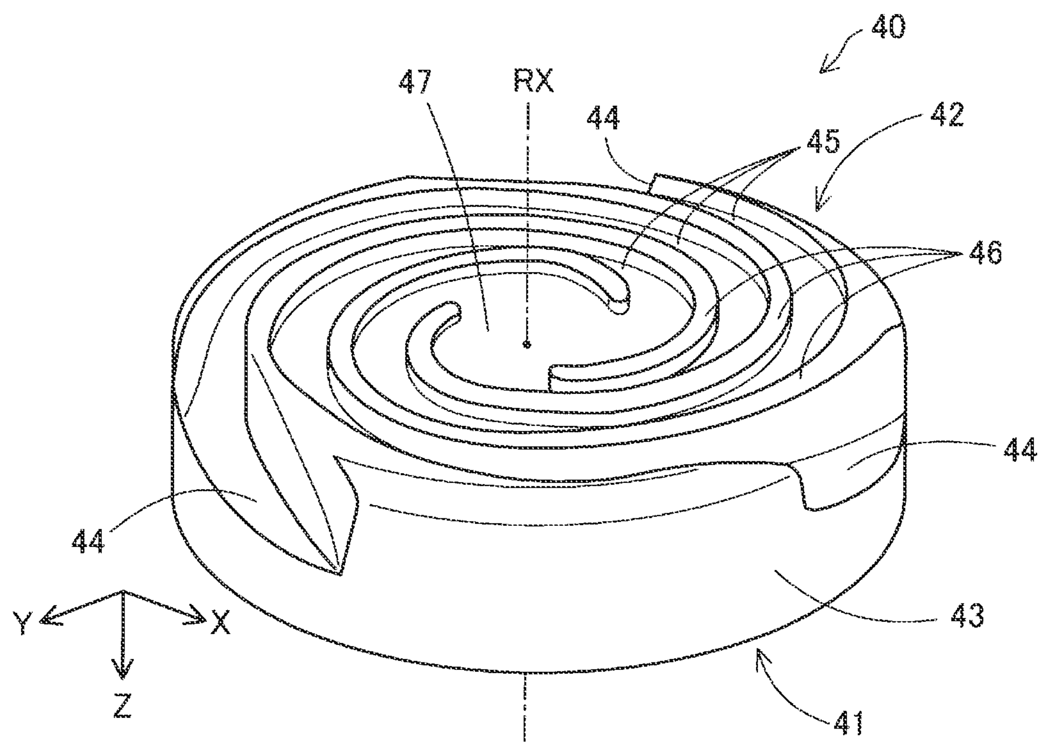
FIG. 3 is a perspective view showing a configuration of a flat screw.

FIG. 3 is a perspective view showing a configuration of the flat screw 40 in this embodiment. In FIG. 3, in order to facilitate the understanding of the technique, the flat screw 40 is shown in a vertically reverse direction to that of FIG. 2. In FIG. 3, the position of the central axis RX of the flat screw 40 is indicated by a long dashed short dashed line.

A central portion 47 that crosses the central axis RX of the grooved face 42 of the flat screw 40 is configured as a recess to which one end of the groove portion 45 is coupled. The central portion 47 is opposed to a communication hole 56 of the barrel 50 shown in FIG. 2.

The groove portion 45 extends in a spiral shape so as to draw an arc toward the outer circumference of the flat screw 40 from the central portion 47. The groove portion 45 may be formed in an involute curve shape or may be configured to extend in a helical shape. In the grooved face 42, a projecting ridge portion 46 that constitutes a side wall portion of the groove portion 45 and that extends along each groove portion 45 is provided. The groove portion 45 continues to a material inlet 44 formed in a side face 43 of the flat screw 40. This material inlet 44 is a portion for receiving the material MR supplied through the supply channel 22 of the material supply section 20. The material MR introduced into the groove portion 45 from the material inlet 44 is conveyed in the groove portion 45 toward the central portion 47 by rotation of the flat screw 40.

In FIG. 3, the flat screw 40 having three groove portions 45 and three projecting ridge portions 46 is shown. The number of groove portions 45 or projecting ridge portions 46 provided in the flat screw 40 is not limited to 3. In the flat screw 40, only one groove portion 45 may be provided, or two or more multiple groove portions 45 may be provided. Further, an arbitrary number of projecting ridge portions 46 may be provided according to the number of groove portions 45. In FIG. 3, the flat screw 40 in which the material inlet 44 is formed at three sites is shown. The number of sites where the material inlet 44 is provided in the flat screw 40 is not limited to 3. In the flat screw 40, the material inlet 44 may be provided at only one site or may be provided at two or more multiple sites.

Figure 4:
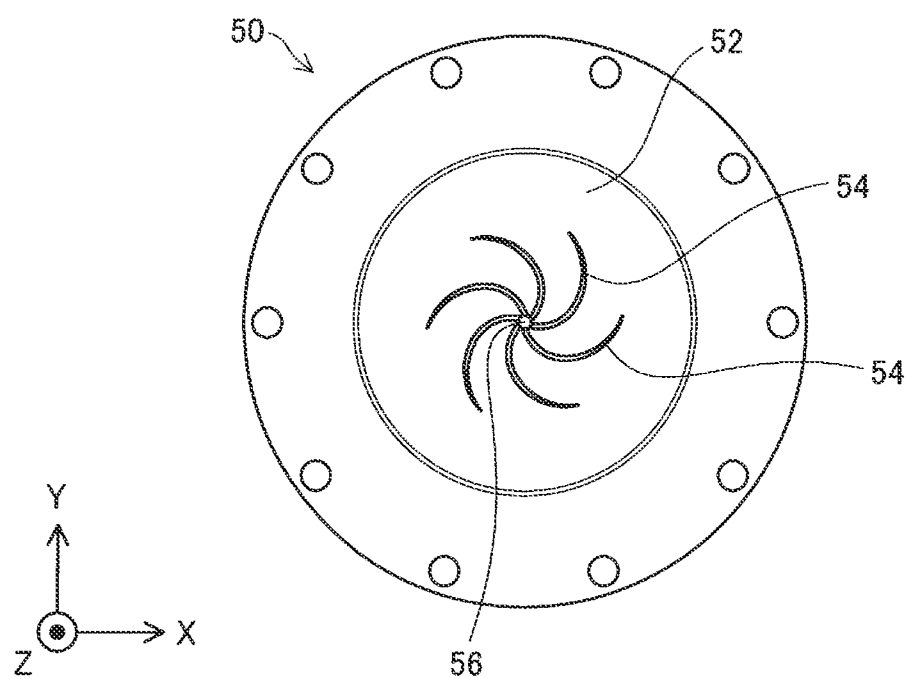
FIG. 4 is a top view showing a configuration of a barrel.

FIG. 4 is a top view showing a configuration of the barrel 50 in this embodiment. The barrel 50 has a screw opposed face 52 opposed to the grooved face 42 of the flat screw 40. At the center of the screw opposed face 52, the communication hole 56 that communicates with the ejection section 60 is provided. In the screw opposed face 52, around the communication hole 56, multiple guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56. One end of the guide groove 54 need not be coupled to the communication hole 56. Further, the screw opposed face 52 need not be provided with the guide groove 54.

As shown in FIG. 2, in the barrel 50, the plasticizing heater 58 for heating the material MR is embedded. In this embodiment, the plasticizing heater 58 generates heat when receiving power supply. The temperature of the plasticizing heater 58 is controlled by the control unit 500.

The material MR conveyed in the groove portion 45 is plasticized due to shearing by rotation of the flat screw 40 and heat from the plasticizing heater 58 and formed into the shaping material in a paste form. The shaping material is supplied from the communication hole 56 to the ejection section 60.

The ejection section 60 is provided below the barrel 50. The ejection section 60 includes the nozzle 61, a flow channel 65, and an ejection amount adjusting section 70. The nozzle 61 has a tip face 63 in a tip portion at the −Z direction side. The nozzle 61 is provided so that the tip face 63 moves along a horizontal plane. At the center of the tip face 63, a nozzle hole 62 is provided. The nozzle hole 62 communicates with the communication hole 56 of the barrel 50 through the flow channel 65. The nozzle ejects the shaping material supplied from the plasticizing section 30 toward the −Z direction from the nozzle hole 62. The shape of the tip face 63 and the opening shape of the nozzle hole 62 are a circular shape. The diameter of the nozzle hole 62 is referred to as "nozzle diameter". The opening shape of the nozzle hole 62 may be, for example, an elliptical shape or a polygonal shape such as a quadrangular shape instead of a circular shape, and the shape of the tip face 63 may be, for example, an elliptical shape or a polygonal shape such as a quadrangular shape instead of a circular shape.

The ejection amount adjusting section 70 adjusts the amount of the shaping material ejected from the nozzle 61. In the following description, the amount of the shaping material ejected from the nozzle 61 is referred to as "ejection amount". In this embodiment, the ejection amount adjusting section 70 includes a drive shaft 72 that is a shaft member, a valve body 73 that opens and closes the flow channel 65 according to the rotation of the drive shaft 72, and a valve drive section 74 that rotates the drive shaft 72.

The drive shaft 72 is attached to the middle of the flow channel 65 so as to cross the flowing direction of the shaping material. In this embodiment, the drive shaft 72 is attached so as to be parallel to the Y direction that is a direction perpendicular to the flowing direction of the shaping material in the flow channel 65. The drive shaft 72 can rotate around the central axis along the Y direction.

The valve body 73 is a member that rotates in the flow channel 65. In this embodiment, the valve body 73 is formed by processing a part of the drive shaft 72 placed in the flow channel 65 into a plate shape. The shape of the valve body 73 when viewed from a direction perpendicular to the plate face substantially matches with the opening shape of the flow channel 65 at a site where the valve body 73 is placed.

The valve drive section 74 rotates the drive shaft 72 under the control of the control unit 500. The valve drive section 74 is constituted by, for example, a stepping motor. The valve body 73 is rotated in the flow channel 65 by rotation of the drive shaft 72.

When the plate face of the valve body 73 is held perpendicular to the flowing direction of the shaping material in the flow channel 65, supply of the shaping material to the nozzle 61 from the flow channel 65 is blocked, and therefore, ejection of the shaping material from the nozzle 61 is stopped. When the drive shaft 72 is rotated by the valve drive section 74, and the plate face of the valve body 73 is held at an acute angle with respect to the flowing direction of the shaping material in the flow channel 65, supply of the shaping material to the nozzle 61 from the flow channel 65 is started, and the shaping material is ejected from the nozzle 61 in an ejection amount according to the rotation angle of the valve body 73. When the plate face of the valve body 73 is held parallel to the flowing direction of the shaping material in the flow channel 65 as shown in FIG. 2, the flow channel 65 is in the most open state. In this state, the ejection amount is the largest. In this manner, the ejection amount adjusting section 70 can not only switch between on and off of the ejection of the shaping material, but also achieve adjustment of the ejection amount.

The stage 300 has a shaping face 301 opposed to the tip face 63 of the nozzle 61. On the shaping face 301, a first shaped article OB1 and a second shaped article OB2 are formed. In this embodiment, the shaping face 301 is provided so as to be parallel to a horizontal plane. The stage 300 is supported by the position changing section 400.

In the stage 300, a stage heater 310 is provided. In this embodiment, the stage heater 310 is embedded in the stage 300 and heats the shaping face 301 of the stage 300 under the control of the control unit 500.

The position changing section 400 changes the relative position of the nozzle 61 and the stage 300. In this embodiment, the position changing section 400 changes the relative position of the nozzle 61 and the stage 300 in the X direction and Y direction by moving the stage 300 in the X direction and Y direction, and changes the relative position of the nozzle 61 and the stage 300 in the Z direction by moving the shaping section 200 along the Z direction. In this embodiment, the position changing section 400 is constituted by a first electric actuator 410 that moves the stage 300 along the X direction, a second electric actuator 420 that moves the stage 300 and the first electric actuator 410 along the Y direction, and a third electric actuator 430 that moves the shaping section 200 along the Z direction. Each of the electric actuators 410 to 430 is driven under the control of the control unit 500.

The position changing section 400 may be configured to change the relative position of the nozzle 61 and the stage 300 by moving the stage 300 in the Z direction and moving the shaping section 200 along the X direction and Y direction. The position changing section 400 may be configured to change the relative position of the nozzle 61 and the stage 300 by moving the stage 300 in the X direction, Y direction, and Z direction without moving the shaping section 200, or may be configured to change the relative position of the nozzle 61 and the stage 300 by moving the shaping section 200 in the X direction, Y direction, and Z direction without moving the stage 300.

The temperature adjusting section 210 is placed at the outer circumference of the nozzle 61. In this embodiment, the temperature adjusting section 210 is fixed to the shaping section 200 through a support section 205. The support section 205 has a rectangular plate-like outer shape. At the center of the support section 205, a through-hole into which the nozzle 61 is inserted is provided. The temperature adjusting section 210 is placed parallel to the shaping face 301 of the stage 300. By changing the relative position of the shaping section 200 and the stage 300 by the position changing section 400, the relative position of the temperature adjusting section 210 fixed to the shaping section 200 and the stage 300 is changed. The area of the temperature adjusting section 210 is larger than the area of the shaping face 301 of the stage 300. The outer periphery of the temperature adjusting section 210 is placed outside a region in which the stage 300 moves with respect to the nozzle 61 when viewed in the −Z direction from the nozzle 61 to the stage 300. That is, even if how the relative position of the temperature adjusting section 210 and the stage 300 is changed by the position changing section 400, the stage 300 is placed inside the outer periphery of the temperature adjusting section 210.

The temperature adjusting section 210 adjusts the temperature of the shaping material stacked on the stage 300 under the control of the control unit 500. In this embodiment, the temperature adjusting section 210 is configured to be able to uniformly heat the entire area of the shaping face 301 of the stage 300. The temperature adjusting section 210 is constituted by, for example, a halogen heater. The temperature adjusting section 210 may be constituted by a nichrome wire heater or a carbon heater, or may be constituted by a heater that feeds hot air.

The temperature sensor 220 is fixed to an outer peripheral edge portion of the support section 205. The temperature sensor 220 measures the temperature of the shaping material stacked on the stage 300. In this embodiment, the temperature sensor 220 is a non-contact type infrared thermometer. The temperature measured by the temperature sensor 220 is sent to the control unit 500.

The control unit 500 is constituted by a computer including one or multiple processors, a main storage device, and an input/output interface for performing signal input/output to/from the outside. The control unit 500 may be constituted by a combination of multiple circuits instead of a computer.

The control unit 500 includes a shaping execution section 510 that executes a three-dimensional shaping process, and a storage section 520 that stores various data. The shaping execution section 510 executes the below-mentioned three-dimensional shaping process by execution of a program or a command read in the main storage device by the processor. The shaping execution section 510 executes the three-dimensional shaping process using shaping data acquired from a computer coupled to the three-dimensional shaping apparatus 100 or a storage medium such as a USB memory.

The storage section 520 stores first relational data. The first relational data represent a relationship between the temperature of the material MR and the viscosity of the material MR. The first relational data can be generated by a test performed in advance. In this embodiment, the first relational data are represented by functions. The first relational data may be represented by maps instead of functions.

Figure 5:
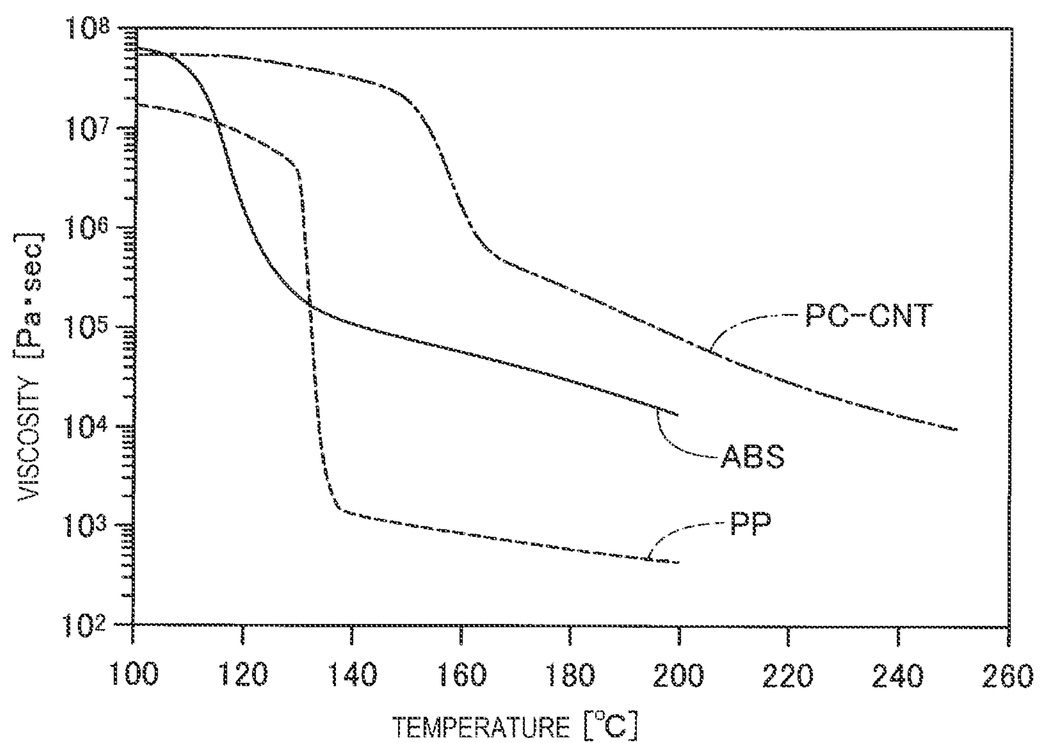
FIG. 5 is an explanatory view showing one example of first relational data.

FIG. 5 is an explanatory view showing one example of the first relational data. In FIG. 5, a graph indicating a relationship between the temperature of the material MR and the viscosity of the material MR is shown. The horizontal axis represents the temperature, and the vertical axis represents the viscosity. The vertical axis is shown on a logarithmic scale. In general, as the temperature of the material MR is higher, the viscosity of the material MR is lower. In FIG. 5, relationships between the temperature and the viscosity of an ABS resin, a polypropylene resin (PP), and a polycarbonate resin with added carbon nanotubes (PC-CNT) are shown.

Figure 6:
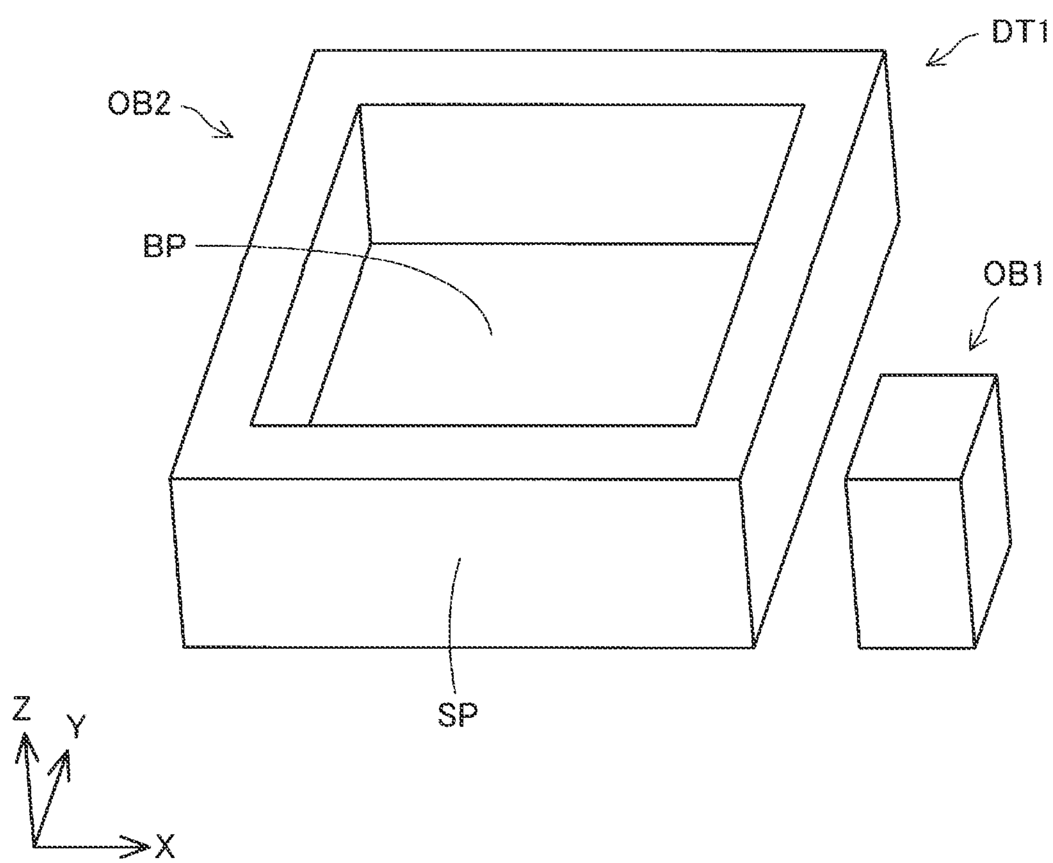
FIG. 6 is an explanatory view showing one example of shape data.
Figure 7:
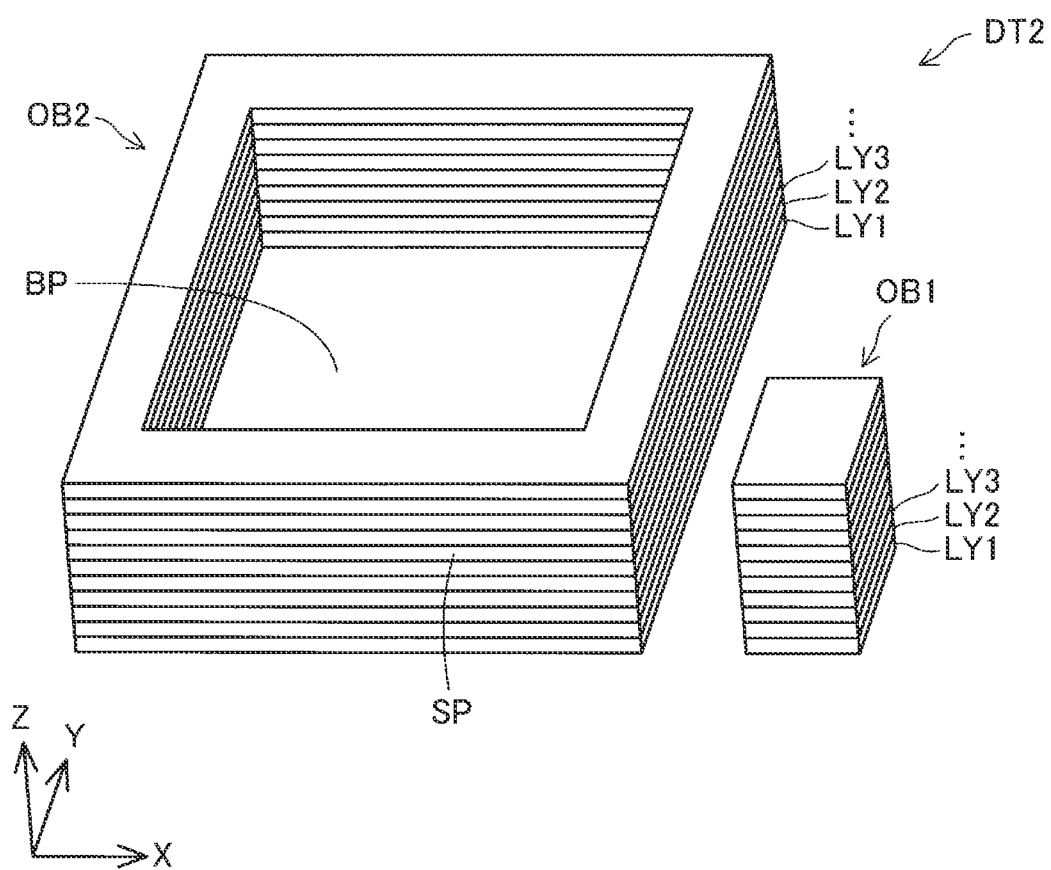
FIG. 7 is an explanatory view showing one example of slice data.
Figure 8:
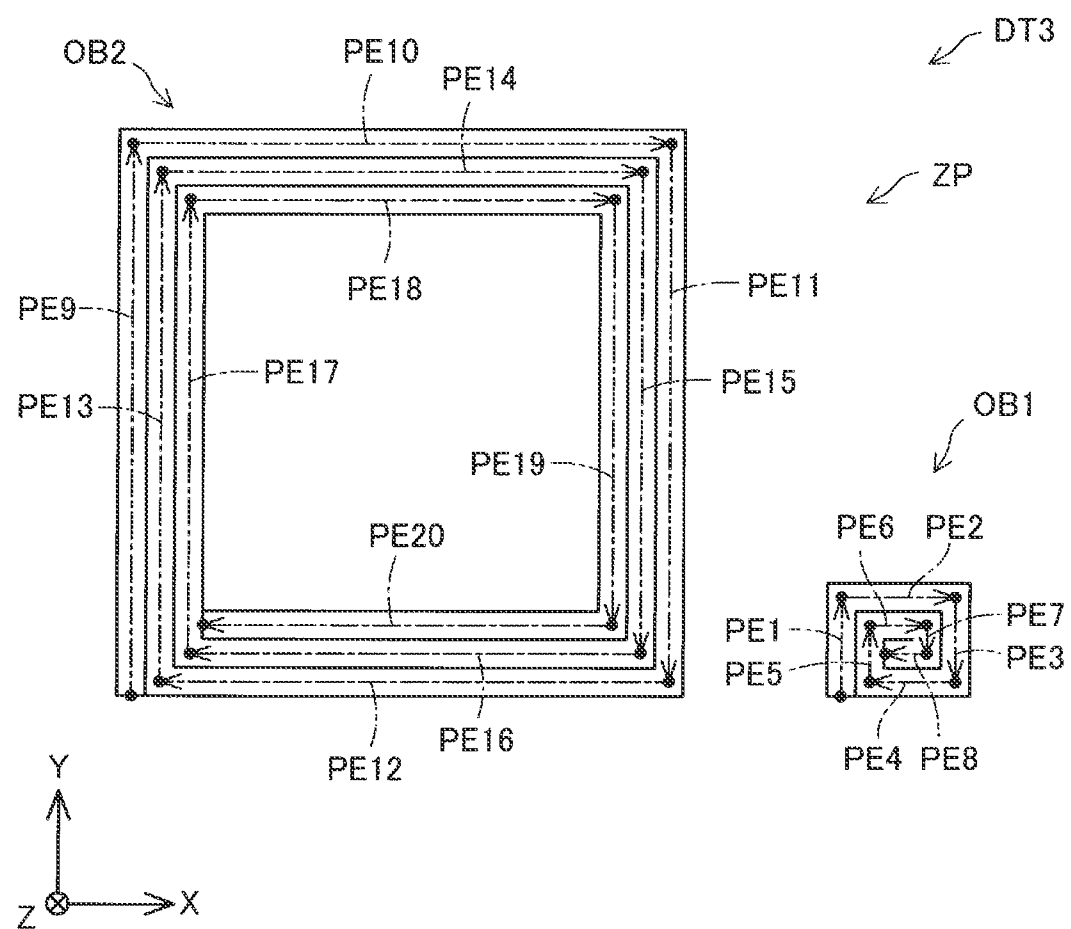
FIG. 8 is an explanatory view showing one example of shaping path data.

FIG. 6 is an explanatory view showing one example of shape data DT1. FIG. 7 is an explanatory view showing one example of slice data DT2. FIG. 8 is an explanatory view showing one example of shaping path data DT3. The shaping data used in the three-dimensional shaping process are generated, for example, by allowing slicer software installed on a computer coupled to the three-dimensional shaping apparatus 100 to read the shape data DT1. The shape data DT1 mean three-dimensional CAD data or three-dimensional CG data.

The shape data DT1 shown in FIG. 6 represent the shape of the first shaped article OB1 and the shape of the second shaped article OB2. The first shaped article OB1 is used for adjusting the output of the temperature adjusting section 210. The second shaped article OB2 has a shape according to the shape of the product. In this example, the first shaped article OB1 has a rectangular parallelepiped outer shape. The second shaped article OB2 has a box-like outer shape with a bottom portion BP and a side portion SP. The shape of the first shaped article OB1 and the shape of the second shaped article OB2 may be represented by separate shape data.

As shown in FIG. 7, the slicer software reads the shape data DT1 and generates the slice data DT2. After the orientation and placement of the first shaped article OB1 on the stage 300 and the orientation and placement of the second shaped article OB2 on the stage 300 are determined, and a stacking pitch is determined, the slice data DT2 in which the first shaped article OB1 and the second shaped article OB2 are divided into multiple layers according to the stacking pitch are generated. The stacking pitch means the thickness of one layer. The respective layers are called "first layer LY1", "second layer LY2", and "third layer LY3" in the order closer to the stage 300.

As shown in FIG. 8, the slicer software generates the shaping path data DT3 using the slice data DT2. The shaping path data DT3 represent a shaping path ZP that is a movement path of the nozzle 61 for forming each layer of the first shaped article OB1 and the second shaped article OB2. In FIG. 8, as one example, the shaping path ZP for one layer for forming the first shaped article OB1 and the second shaped article OB2 is indicated by a long dashed short dashed line. In this example, the shaping path ZP is constituted by multiple linear shaping path elements PE1 to PE20. By ejecting the shaping material from the nozzle 61 along the shaping path elements PE1 to PE8, a layer of the first shaped article OB1 is formed like one stroke drawing, and by ejecting the shaping material from the nozzle 61 along the shaping path elements PE9 to PE20, a layer of the second shaped article OB2 is formed like one stroke drawing.

The shaping data represent, other than the shaping path ZP, a target value of the ejection amount when forming a layer along the shaping path ZP, a target value of the output of the plasticizing heater 58, a target value of the output of the temperature adjusting section 210, a target value of the output of the stage heater 310, a target value of the viscosity of the shaping material stacked on the stage 300, and the like. The target value of the output of the temperature adjusting section 210 means, for example, a target value of thermal energy generated by the temperature adjusting section 210, a target value of the temperature of the temperature adjusting section 210, or a target value of an electric current supplied to the temperature adjusting section 210.

Figure 9:
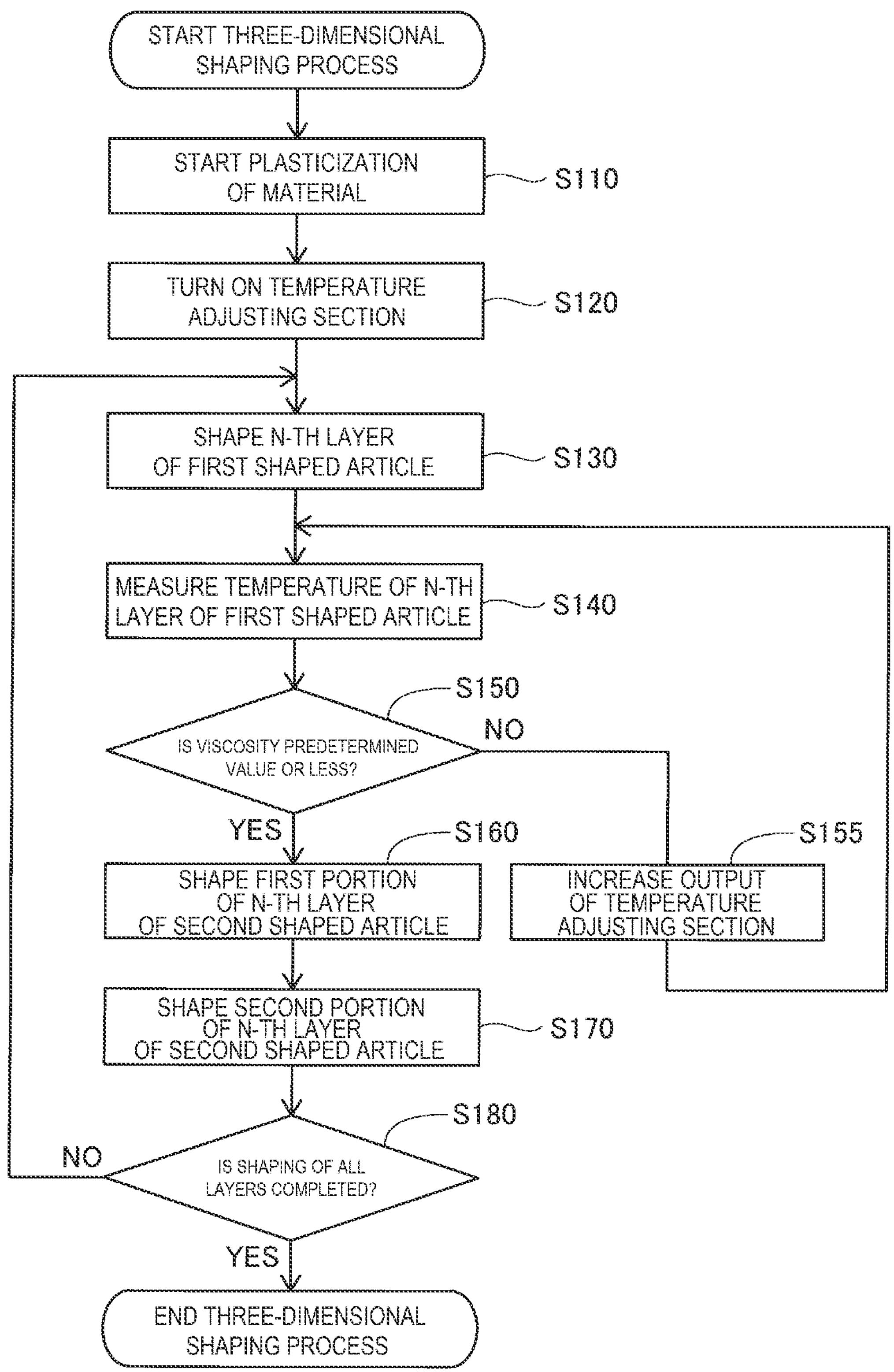
FIG. 9 is a flowchart showing the contents of a three-dimensional shaping process of the first embodiment.

FIG. 9 is a flowchart showing the contents of the three-dimensional shaping process in this embodiment. This process is started by the shaping execution section 510 when a predetermined start command is supplied. The start command is, for example, supplied to the shaping execution section 510 when a start button provided in the three-dimensional shaping apparatus 100 is pressed.

First, in Step S110, the shaping execution section 510 starts the formation of the shaping material. The shaping execution section 510 forms the shaping material by controlling the rotation of the flat screw 40 and the temperature of the plasticizing heater 58 so as to plasticize a material. The shaping material is kept formed while performing this process.

Subsequently, in Step S120, the shaping execution section 510 turns on the output of the temperature adjusting section 210 and the stage heater 310. The shaping execution section 510 starts the operation of the temperature adjusting section 210 and the stage heater 310 with the output represented by the shaping data. In this embodiment, the output of the temperature adjusting section 210 and the stage heater 310 is turned on while performing this process.

In Step S130, the shaping execution section 510 forms an n-th layer of the first shaped article OB1 by ejecting the shaping material from the nozzle 61. "n" is a natural number. The shaping execution section 510 forms the n-th layer of the first shaped article OB1 by ejecting the shaping material from the nozzle 61 while moving the nozzle 61 along the shaping path represented by the shaping data with respect to the stage 300. In this embodiment, the shaping material is ejected at a temperature of 250 degrees Celsius from the nozzle 61. As described later, the process of Step S130 is executed multiple times. In the first round of Step S130, the shaping execution section 510 forms the first layer LY1 of the first shaped article OB1, and in the second round of Step S130, the shaping execution section 510 forms the second layer LY2 of the first shaped article OB1. The control executed in Step S130 is sometimes referred to as "first control".

In Step S140, the shaping execution section 510 measures the temperature of the n-th layer of the first shaped article OB1 by the temperature sensor 220. In this embodiment, the shaping execution section 510 measures the temperature of the n-th layer of the first shaped article OB1 by the temperature sensor 220 after moving the temperature sensor 220 to a position at which the temperature of the n-th layer of the first shaped article OB1 can be measured by controlling the position changing section 400.

In Step S150, the shaping execution section 510 determines whether or not the viscosity of the n-th layer of the first shaped article OB1 is a predetermined viscosity or less. In this embodiment, the shaping execution section 510 determines that the viscosity of the n-th layer of the first shaped article OB1 is a predetermined viscosity or less when the viscosity calculated based on the temperature of the n-th layer of the first shaped article OB1 measured by the temperature sensor 220 and the first relational data is a target value of the viscosity of the shaping material represented by the shaping data or less. The target value of this viscosity is set to a value at which the n-th layer is crushed in a predetermined amount or more by its own weight. In this embodiment, the target value of the viscosity is 100,000 Pa·sec. Therefore, the temperature of the n-th layer is kept at 130 degrees Celsius or higher by heating the n-th layer by the temperature adjusting section 210 with the output after adjustment.

When it is not determined that the viscosity of the n-th layer of the first shaped article OB1 is a predetermined viscosity or less in Step S150, the shaping execution section 510 increases the output of the temperature adjusting section 210 in Step S155. Thereafter, the shaping execution section 510 returns the process to Step S140, and measures the temperature of the n-th layer of the first shaped article OB1 by the temperature sensor 220 and determines whether or not the viscosity of the n-th layer of the first shaped article OB1 is a predetermined value or less in Step S150. The shaping execution section 510 repeats the process of Step S155, Step S140, and Step S150 until it is determined that the viscosity of the n-th layer of the first shaped article OB1 is a predetermined viscosity or less in Step S150. That is, in this embodiment, the shaping execution section 510 adjusts the output of the temperature adjusting section 210 while measuring the temperature of the n-th layer of the first shaped article OB1 by the temperature sensor 220 so that the viscosity of the n-th layer of the first shaped article OB1 calculated based on the temperature of the n-th layer of the first shaped article OB1 measured by the temperature sensor 220 and the first relational data is a predetermined viscosity or less. The shaping execution section 510 stores the output of the temperature adjusting section 210 when it is determined that the viscosity of the n-th layer of the first shaped article OB1 is a predetermined viscosity or less in the storage section 520. Note that the control executed in Step S155, Step S140, and Step S150 is sometimes referred to as "second control".

When it is determined that the viscosity of the n-th layer of the first shaped article OB1 is a predetermined viscosity or less in Step S150, in Step S160, the shaping execution section 510 forms a portion, which is not adjacent to the portion of the n-th layer that has already been formed, of the n-th layer of the second shaped article OB2 by ejecting the shaping material from the nozzle 61. The portion, which is not adjacent to the portion of the n-th layer that has already been formed, of the n-th layer of the second shaped article OB2 is referred to as "first portion". In the example shown in FIG. 8, the portion formed along the shaping path elements PE9 to PE 12 is the first portion. The shaping execution section 510 forms the first portion by ejecting the shaping material from the nozzle 61 while moving the nozzle 61 along the shaping path represented by the shaping data with respect to the stage 300. In this embodiment, when the first portion is formed, the shaping execution section 510 operates the temperature adjusting section 210 according to the target value of the output stored in the storage section 520. When the first portion is formed, the shaping execution section 510 may temporarily turn off the output of the temperature adjusting section 210. The control executed in Step S160 is sometimes referred to as "third control".

In Step S170, the shaping execution section 510 forms a portion, which is adjacent to the portion that has already been formed, of the n-th layer of the second shaped article OB2 by ejecting the shaping material from the nozzle 61 while heating the portion that has already been formed of the n-th layer of the second shaped article OB2 by operating the temperature adjusting section 210 according to the target value of the output stored in the storage section 520. The portion, which is adjacent to the portion that has already been formed, of the n-th layer of the second shaped article OB2 is referred to as "second portion". In the example shown in FIG. 8, the portion formed along the shaping path elements PE13 to PE 20 is the second portion. The shaping execution section 510 forms the second portion by ejecting the shaping material from the nozzle 61 while moving the nozzle 61 along the shaping path represented by the shaping data with respect to the stage 300. The control executed in Step S170 is sometimes referred to as "fourth control".

In Step S180, the shaping execution section 510 determines whether or not the formation of all layers is completed. The shaping execution section 510 can determine whether or not the formation of all layers is completed by referring to the shaping data. When it is not determined that the formation of all layers is completed in Step S180, the shaping execution section 510 widens the distance between the nozzle 61 and the stage 300 by the thickness of the n-th layer by controlling the position changing section 400, and thereafter returns the process to Step S130, and forms the n+1-th layer of the first shaped article OB1 and the second shaped article OB2. The shaping execution section 510, for example, forms the second layer LY2 of the first shaped article OB1 and the second shaped article OB2 after forming the first layer LY1 of the first shaped article OB1 and the second shaped article OB2, and forms the third layer LY3 of the first shaped article OB1 and the second shaped article OB2 after forming the second layer LY2 of the first shaped article OB1 and the second shaped article OB2. The shaping execution section 510 forms all layers of the first shaped article OB1 and the second shaped article OB2 by repeating the process from Step S130 to Step S180 until it is determined that the formation of all layers is completed in Step S180. When it is determined that the formation of all layers is completed in Step S180, the shaping execution section 510 ends this process.

Figure 10:
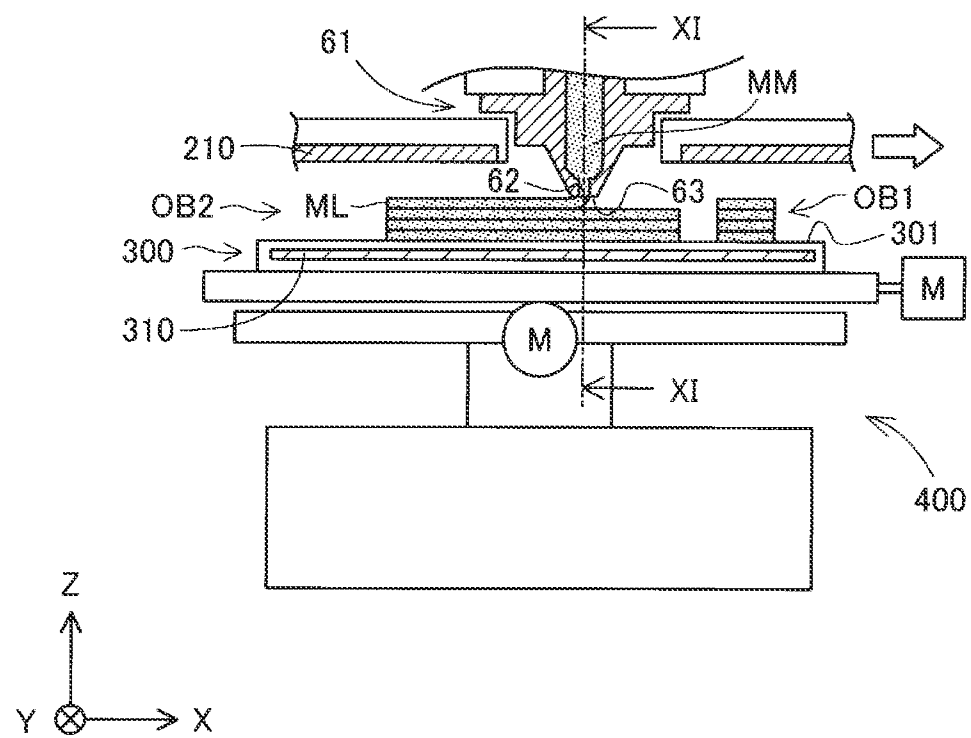
FIG. 10 is an explanatory view schematically showing a manner of forming a first shaped article and a second shaped article.
Figure 11:
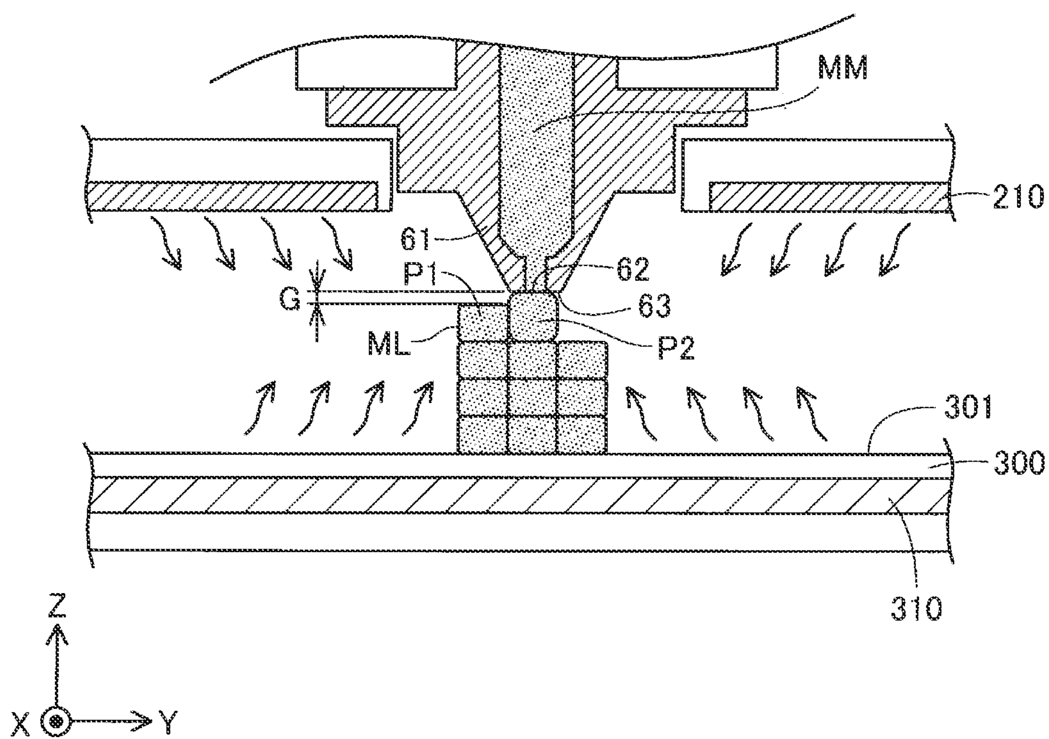
FIG. 11 is a cross-sectional view taken along the line XI-XI of FIG. 10.

FIG. 10 is an explanatory view schematically showing a manner of forming the first shaped article OB1 and the second shaped article OB2 by the above-mentioned three-dimensional shaping process. FIG. 11 is a cross-sectional view taken along the line XI-XI of FIG. 10. In Step S130, Step S160, and Step S170 of the three-dimensional shaping process shown in FIG. 9, the shaping execution section 510 ejects a shaping material MM from the nozzle 61 while changing the relative position of the stage 300 and the nozzle 61 as shown in FIG. 10. At this time, the shaping execution section 510 changes the relative position of the stage 300 and the nozzle 61 while keeping the distance between the shaping face 301 of the stage 300 and the tip face 63 of the nozzle 61 constant. The shaping material MM ejected from the nozzle 61 is deposited on the stage 300 in a linear form along the movement path of the nozzle 61. The shaping material MM deposited on the stage 300 is crushed by its own weight, and then hardened by cooling.

By repeating the process from Step S130 to Step S180 shown in FIG. 9, the shaping execution section 510 forms a layer ML of the first shaped article OB1 and the second shaped article OB2, moves the position of the nozzle 61 in the +Z direction with respect to the stage 300, and further stacks a layer ML on the layer ML formed until then, thereby forming the first shaped article OB1 and the second shaped article OB2.

As shown in FIG. 11, as the distance between the layer ML and the shaping face 301 of the stage 300 becomes longer, it becomes more difficult to transfer heat to the layer ML from the stage heater 310. Therefore, when the output of the temperature adjusting section 210 is not changed, the shaping material MM ejected from the nozzle 61 is cooled, and the viscosity of the shaping material MM is likely to increase. When the viscosity of the shaping material MM increases, the shaping material MM is less likely to be crushed. Due to the assembly accuracy of the respective members constituting the three-dimensional shaping apparatus 100, or the like, it is difficult to keep the tip face 63 of the nozzle 61 and the shaping face 301 of the stage 300 completely parallel to each other. Therefore, when the shaping material MM is less likely to be crushed, the nozzle 61 may come in contact with the layer ML during the formation of the layer ML.

In this embodiment, the shaping execution section 510 adjusts the output of the temperature adjusting section 210 so that the viscosity of the shaping material MM becomes 100,000 Pa·sec or less by executing the process from Step S140 to Step S155. A first portion P1 that has already been formed is heated by the temperature adjusting section 210 with the adjusted output prior to the formation of a second portion P2 adjacent to the first portion P1. By heating from the temperature adjusting section 210, the temperature of the first portion P1 is kept at 130 degrees Celsius or higher at which the viscosity of the shaping material MM becomes 100,000 Pa·sec or less. When the viscosity of the shaping material MM becomes 100,000 Pa·sec or less, the shaping material MM is likely to be crushed by its own weight. Therefore, the distance G between the nozzle 61 and the first portion P1 in the Z direction is ensured.

According to the three-dimensional shaping apparatus 100 of this embodiment described above, the shaping execution section 510 can widen the distance G between the nozzle 61 and the first portion P1 by adjusting the temperature of the first portion P1 of the layer ML of the second shaped article OB2 using the temperature adjusting section 210 with the adjusted output prior to the formation of the second portion P2 of the layer ML of the second shaped article OB2 so as to decrease the viscosity of the first portion P1 and crush the first portion P1 by its own weight. Therefore, the shape of the second shaped article OB2 can be prevented from collapsing due to contact of the nozzle 61 with the first portion P1 when forming the second portion P2. Moreover, in this embodiment, the output of the temperature adjusting section 210 is adjusted using the temperature of the first portion P1 measured by the non-contact type temperature sensor 220, and therefore, the shape of the three-dimensional shaped article can be prevented from collapsing when measuring the temperature of the first portion P1.

Further, in this embodiment, the temperature adjusting section 210 is constituted by a heater that uniformly heats the shaping face 301 of the stage 300, and therefore, the first portion P1 of the second shaped article OB2 formed on the shaping face 301 can be uniformly heated by the temperature adjusting section 210. In particular, in this embodiment, the first portion P1 can be evenly heated in a wide range as compared to a configuration in which the first portion P1 of the second shaped article OB2 is heated by irradiating the first portion P1 with a laser in a dotted manner. Further, a target site can be heated by a simple control as compared to a configuration in which the first portion P1 is heated in a dotted manner by irradiation with a laser.

Further, in this embodiment, the temperature adjusting section 210 is fixed to the shaping section 200, and therefore, the nozzle 61 and the temperature adjusting section 210 can be moved without changing the relative position of the nozzle 61 and the temperature adjusting section 210. Accordingly, inhibition of the movement of the nozzle 61 by the temperature adjusting section 210 can be suppressed.

Further, in this embodiment, the outer periphery of the temperature adjusting section 210 is placed outside a region in which the stage 300 moves with respect to the nozzle 61 when viewed in the −Z direction from the nozzle to the stage 300. Therefore, even if the relative position of the stage 300 to the nozzle 61 is changed to any position by the position changing section 400, the stage 300 is placed inside the outer periphery of the temperature adjusting section 210, and therefore, the temperature of the first portion P1 of the second shaped article OB2 formed on the stage 300 can be easily adjusted by the temperature adjusting section 210.

B. Second Embodiment

FIG. 12 is a flowchart showing the contents of a three-dimensional shaping process in a second embodiment. The second embodiment is different from the first embodiment in that the shaping execution section 510 adjusts the output of the temperature adjusting section 210 using the second shaped article OB2 without shaping the first shaped article OB1 shown in FIG. 6. The other configuration is the same as that of the first embodiment unless otherwise specified. In this embodiment, the second shaped article OB2 is simply referred to as “shaped article OB”.

As shown in FIG. 12, in this embodiment, when the three-dimensional shaping process is started, first, in Step S210, the shaping execution section 510 starts the formation of the shaping material. Subsequently, in Step S220, the shaping execution section 510 turns on the output of the temperature adjusting section 210 and the stage heater 310. Thereafter, in Step S230, the shaping execution section 510 forms a first portion, which is not adjacent to a portion of the n-th layer that has already been formed, of the n-th layer of the shaped article OB by ejecting the shaping material from the nozzle 61. The control executed in Step S230 is sometimes referred to as "first control".

In Step S240, the shaping execution section 510 measures the temperature of the first portion of the n-th layer of the shaped article OB by the temperature sensor 220. In Step S250, the shaping execution section 510 determines whether or not the viscosity of the first portion of the n-th layer is a predetermined viscosity or less. When it is not determined that the viscosity of the first portion of the n-th layer is a predetermined viscosity or less in Step S250, the shaping execution section 510 increases the output of the temperature adjusting section 210 in Step S255. Thereafter, the shaping execution section 510 returns the process to Step S240, and measures the temperature of the first portion of the n-th layer by the temperature sensor 220 and determines whether or not the viscosity of the first portion of the n-th layer is a predetermined value or less in Step S250. The shaping execution section 510 repeats the process of Step S255, Step S240, and Step S250 until it is determined that the viscosity of the first portion of the n-th layer is a predetermined viscosity or less in Step S250. That is, in this embodiment, the shaping execution section 510 adjusts the output of the temperature adjusting section 210 while measuring the temperature of the first portion of the n-th layer by the temperature sensor 220 so that the viscosity of the first portion of the n-th layer calculated based on the temperature of the first portion of the n-th layer measured by the temperature sensor 220 and the first relational data is a predetermined viscosity or less. The shaping execution section 510 stores the output of the temperature adjusting section 210 when it is determined that the viscosity of the first portion of the n-th layer is a predetermined viscosity or less in the storage section 520. Note that the control executed in Step S255, Step S240, and Step S250 is sometimes referred to as "second control".

In Step S270, the shaping execution section 510 forms a second portion, which is adjacent to the portion that has already been formed, of the n-th layer by ejecting the shaping material from the nozzle 61 while heating the n-th layer by operation with the temperature adjusting section 210 according to the target value of the output stored in the storage section 520. The control executed in Step S270 is sometimes referred to as "third control".

In Step S280, the shaping execution section 510 determines whether or not the formation of all layers is completed. The shaping execution section 510 forms all layers of the shaped article OB by repeating the process from Step S230 to Step S280 until it is determined that the formation of all layers is completed in Step S280. When it is determined that the formation of all layers is completed in Step S280, the shaping execution section 510 ends this process.

According to the three-dimensional shaping apparatus 100 of this embodiment described above, the distance G between the nozzle 61 and the first portion P1 can be widened by decreasing the viscosity of the first portion P1 so as to crush the first portion P1 by its own weight even without forming multiple shaped articles. Therefore, the shape of the shaped article OB can be prevented from collapsing due to contact of the nozzle 61 with the first portion P1 when forming the second portion P2.

C. Third Embodiment

Figure 13:
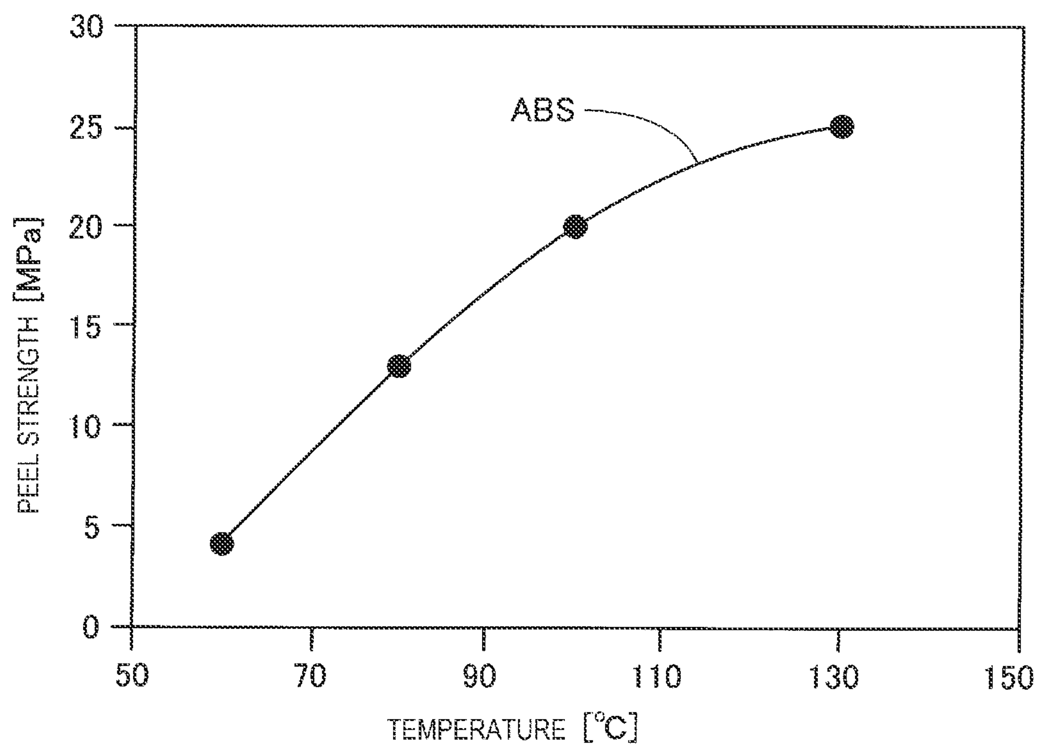
FIG. 13 is an explanatory view showing one example of second relational data of a third embodiment.

FIG. 13 is an explanatory view showing one example of second relational data. A third embodiment is different from the first embodiment in that the control unit 500 adjusts the output of the temperature adjusting section 210 using the first relational data and the second relational data. The other configuration is the same as that of the first embodiment unless otherwise specified.

In this embodiment, the storage section 520 stores the first relational data and the second relational data. The second relational data represent a relationship between a temperature of a material and a peel strength. The second relational data can be generated by a test performed in advance. In this embodiment, the second relational data are represented by functions. The second relational data may be represented by maps instead of functions.

In FIG. 13, a graph indicating a relationship between a temperature of a material and a peel strength is shown. In FIG. 13, the horizontal axis represents the temperature, and the vertical axis represents the peel strength. In general, as the temperature is higher, the peel strength is higher. In FIG. 13, as an example, the peel strength of an ABS resin is shown.

In this embodiment, the shaping execution section 510 executes the same three-dimensional shaping process as the three-dimensional shaping process shown in FIG. 9. However, in the three-dimensional shaping process of this embodiment, in Step S150 shown in FIG. 9, the shaping execution section 510 determines whether or not the conditions that the viscosity of the n-th layer of the first shaped article OB1 is a predetermined viscosity or less, and the peel strength of the n-th layer of the first shaped article OB1 is a predetermined strength or more are satisfied. In this embodiment, the shaping execution section 510 determines that the viscosity of the n-th layer of the first shaped article OB1 is a predetermined viscosity or less when the viscosity calculated based on the temperature of the n-th layer of the first shaped article OB1 measured by the temperature sensor 220 and the first relational data is a target value of the viscosity of the shaping material represented by the shaping data or less. The shaping execution section 510 determines that the peel strength of the n-th layer of the first shaped article OB1 is a predetermined strength or more when the peel strength calculated based on the temperature of the n-th layer of the first shaped article OB1 measured by the temperature sensor 220 and the second relational data is a target value of the peel strength of the shaping material represented by the shaping data or more.

According to the three-dimensional shaping apparatus 100 of this embodiment described above, the shaping execution section 510 calculates the viscosity based on the temperature measured by the temperature sensor 220 and the first relational data, calculates the peel strength based on the temperature measured by the temperature sensor 220 and the second relational data, and adjusts the output of the temperature adjusting section 210 so as to satisfy the conditions that the viscosity is a predetermined value or less and the peel strength is a predetermined value or more in the three-dimensional shaping process. Therefore, the strength of the second shaped article OB2 can be enhanced. In this embodiment, the shaping execution section 510 may execute the same three-dimensional shaping process as the three-dimensional shaping process shown in FIG. 12. In this case, in Step S250 shown in FIG. 12, the shaping execution section 510 determines whether or not the conditions that the viscosity of the first portion of the n-th layer of the shaped article OB is a predetermined viscosity or less, and the peel strength of the first portion of the n-th layer of the shaped article OB is a predetermined strength or more are satisfied. By this process, the strength of the shaped article OB can be enhanced.

D. Other Embodiments (D1) In the three-dimensional shaping apparatus 100 of each of the above-mentioned embodiments, in the stage 300, the stage heater 310 is provided. On the other hand, in the stage 300, the stage heater 310 need not be provided.

(D2) In the three-dimensional shaping apparatus 100 of each of the above-mentioned embodiments, the temperature adjusting section 210 is configured to be able to uniformly heat the entire area of the shaping face 301 of the stage 300. That is, the temperature adjusting section 210 is configured to be able to uniformly heat the entire area of the layer of the shaping material formed on the shaping face 301. On the other hand, the temperature adjusting section 210 need not be configured to be able to uniformly heat the layer of the shaping material formed on the shaping face 301. In this case, the temperature adjusting section 210 may be, for example, configured to locally heat the layer of the shaping material by irradiation with a laser.

(D3) In the three-dimensional shaping apparatus 100 of each of the above-mentioned embodiments, the temperature adjusting section 210 is fixed to the shaping section 200. On the other hand, the temperature adjusting section 210 need not be fixed to the shaping section 200. In this case, the temperature adjusting section 210 may be moved separately from the shaping section 200 by, for example, being supported so as to be movable in three X, Y, and Z directions.

(D4) In the three-dimensional shaping apparatus 100 of each of the above-mentioned embodiments, the outer periphery of the temperature adjusting section 210 is placed outside a region in which the stage 300 moves with respect to the nozzle 61 when viewed in the −Z direction from the nozzle 61 to the stage 300. On the other hand, the outer periphery of the temperature adjusting section 210 need not be placed outside a region in which the stage 300 moves with respect to the nozzle 61 when viewed in the −Z direction from the nozzle 61 to the stage 300. For example, a part or the whole of the stage 300 may be located outside the outer periphery of the temperature adjusting section 210 when viewed in the −Z direction by moving the stage 300 with respect to the nozzle 61.

(D5) In the three-dimensional shaping apparatus 100 of each of the above-mentioned embodiments, the plasticizing section 30 includes the flat screw 40, and plasticizes the material MR by rotation of the flat screw 40. On the other hand, the plasticizing section 30 may include, for example, an in-line screw having a spiral groove in a side portion, and plasticize the material MR by rotation of the in-line screw instead of the flat screw 40. A material filament may be plasticized by heating with a heater without using the flat screw 40 or the in-line screw.

(D6) In the three-dimensional shaping apparatus 100 of each of the above-mentioned embodiments, an ABS resin in a pellet form is used as the material MR, however, as the material MR to be used in the shaping section 200, it is also possible to adopt a material for forming the three-dimensional shaped article using, for example, any of various materials such as a material having thermoplasticity, a metal material, and a ceramic material as a main material. Here, the "main material" means a material serving as a main component for forming the shape of the three-dimensional shaped article and refers to a material whose content ratio is 50 wt % or more in the three-dimensional shaped article. In the above-mentioned shaping material, a material obtained by melting such a main material singly, and a material formed into a paste by melting some components contained together with the main material are included.

When a material having thermoplasticity is used as the main material, the shaping material is formed by plasticizing the material in the plasticizing section 30. The "plasticizing" means melting by applying heat to a material having thermoplasticity. Further, the "melting" also means softening a material having thermoplasticity by heating to a temperature equal to or higher than the glass transition point so as to exhibit fluidity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone (PEEK)

In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and transformed into a molten state by rotation of the flat screw 40 and heating by the plasticizing heater 58 in the plasticizing section 30. The shaping material formed in this manner is hardened by decreasing the temperature after being ejected from the nozzle 61.

The material having thermoplasticity is desirably ejected from the nozzle 61 in a completely molten state by being heated to a temperature equal to or higher than the glass transition point thereof. The "completely molten state" refers to a state in which an unmolten material having thermoplasticity is not present, and means, for example, when a thermoplastic resin in a pellet form is used as the material, a state in which a solid material in a pellet form does not remain.

In the shaping section 200, in place of the above-mentioned material having thermoplasticity, for example, the following metal material may be used as the main material. In this case, it is desirable that a component that melts when forming the shaping material is mixed in a powder material obtained by pulverizing the following metal material, and the resulting material is fed to the plasticizing section 30.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, a stainless steel, cobalt-chromium-molybdenum, a titanium alloy, a nickel alloy, an aluminum alloy, a cobalt alloy, and a cobalt-chromium alloy In the shaping section 200, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material placed at the stage 300 may be hardened by, for example, irradiation with a laser or sintering with hot air or the like.

The powder material of a metal material or a ceramic material to be fed to the material supply section 20 may be a mixed material obtained by mixing multiple types of single metal powders or alloy powders or ceramic material powders.

To the powder material of a metal material or a ceramic material to be fed to the material supply section 20, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of a metal material or a ceramic material to be fed to the material supply section 20.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins E. Other Aspects The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a three-dimensional shaping apparatus is provided. The three-dimensional shaping apparatus includes a stage, an ejection section that ejects a molten material toward the stage, a position changing section that changes a relative position of the stage and the ejection section, a temperature adjusting section that adjusts a temperature of the material ejected to the stage, a temperature sensor that measures the temperature of the material ejected to the stage, a storage section that stores first relational data representing a relationship between the temperature of the material and a viscosity of the material, and a control unit that controls the ejection section, the position changing section, and the temperature adjusting section so as to form a first shaped article and a second shaped article on the stage. The control unit executes first control for shaping the first shaped article by ejecting the material from the ejection section, second control for adjusting an output of the temperature adjusting section while measuring a temperature of the first shaped article by the temperature sensor so that a viscosity of the first shaped article calculated based on the temperature of the first shaped article measured by the temperature sensor and the first relational data becomes a predetermined viscosity or less, third control for forming a first portion of the second shaped article by ejecting the material from the ejection section, and fourth control for forming a second portion that is a portion adjacent to the first portion of the second shaped article by ejecting the material from the ejection section while adjusting a temperature of the first portion by the temperature adjusting section with the output adjusted in the second control.

According to the three-dimensional shaping apparatus of this aspect, the distance between the ejection section and the first portion can be widened by adjusting the temperature of the first portion of the second shaped article using the temperature adjusting section with the output adjusted in the second control prior to the formation of the second portion of the second shaped article so as to decrease the viscosity of the first portion and crush the first portion by its own weight. Therefore, the shape of the second shaped article can be prevented from collapsing due to contact of the ejection section with the first portion when forming the second portion.

(2) In the three-dimensional shaping apparatus of the above aspect, the temperature adjusting section may be constituted by a heater that uniformly heats the stage.

According to the three-dimensional shaping apparatus of this aspect, the first portion of the second shaped article formed on the stage can be uniformly heated by the temperature adjusting section.

(3) In the three-dimensional shaping apparatus of the above aspect, the temperature adjusting section may be fixed to the ejection section.

According to the three-dimensional shaping apparatus of this aspect, the temperature adjusting section is fixed to the ejection section, and therefore, the temperature adjusting section can be moved together with the ejection section by the position changing section.

(4) In the three-dimensional shaping apparatus of the above aspect, an outer periphery of the temperature adjusting section may be placed outside a region in which the stage moves relatively with respect to the ejection section when viewed in a direction from the ejection section to the stage.

According to the three-dimensional shaping apparatus of this aspect, even if the relative position of the stage to the ejection section is changed to any position by the position changing section, the stage is placed inside the outer periphery of the temperature adjusting section, and therefore, the temperature of the first portion of the second shaped article formed on the stage can be easily adjusted by the temperature adjusting section.

(5) In the three-dimensional shaping apparatus of the above aspect, the storage section stores second relational data representing a relationship between the temperature of the material and a peel strength between portions formed of the material, and the control unit may adjust the output of the temperature adjusting section while measuring the temperature of the first shaped article by the temperature sensor so that the viscosity of the first shaped article calculated based on the temperature of the first shaped article measured by the temperature sensor and the first relational data becomes a predetermined viscosity or less in the second control, and the peel strength calculated based on the temperature of the first shaped article measured by the temperature sensor and the second relational data becomes a predetermined strength or more.

According to the three-dimensional shaping apparatus of this aspect, by enhancing the peel strength between the first portion and the second portion constituting the second shaped article, the strength of the second shaped article can be enhanced.

(6) According to the second aspect of the present disclosure, a three-dimensional shaping apparatus is provided. The three-dimensional shaping apparatus includes a stage, an ejection section that ejects a molten material toward the stage, a position changing section that changes a relative position of the stage and the ejection section, a temperature adjusting section that adjusts a temperature of the material ejected to the stage, a temperature sensor that measures the temperature of the material ejected to the stage, a storage section that stores first relational data representing a relationship between the temperature of the material and a viscosity of the material, and a control unit that controls the ejection section, the position changing section, and the temperature adjusting section so as to form a shaped article on the stage. The control unit executes first control for forming a first portion of the shaped article by ejecting the material from the ejection section, second control for adjusting an output of the temperature adjusting section while measuring a temperature of the first portion by the temperature sensor so that a viscosity of the first portion calculated based on the temperature of the first portion measured by the temperature sensor and the first relational data becomes a predetermined viscosity or less, and third control for forming a second portion that is a portion adjacent to the first portion of the shaped article by ejecting the material from the ejection section while adjusting the temperature of the first portion by the temperature adjusting section with the output adjusted in the second control.

According to the three-dimensional shaping apparatus of this aspect, the distance between the ejection section and the first portion can be widened by adjusting the temperature of the first portion of the shaped article using the temperature adjusting section with the output adjusted in the second control prior to the formation of the second portion of the shaped article so as to decrease the viscosity of the first portion and crush the first portion by its own weight. Therefore, the shape of the shaped article can be prevented from collapsing due to contact of the ejection section with the first portion when forming the second portion.

The present disclosure can also be realized in various forms other than the three-dimensional shaping apparatus. For example, it can be realized in the form of a method for producing a three-dimensional shaped article, and the like.

What is claimed is:

1. A three-dimensional shaping apparatus, comprising:

a stage;

an ejection section that ejects a molten material toward the stage;

a position changing section that changes a relative position of the stage and the ejection section;

a temperature adjusting section that adjusts a temperature of the material ejected to the stage;

a temperature sensor that measures the temperature of the material ejected to the stage;

a storage section that stores first relational data representing a relationship between the temperature of the material and a viscosity of the material; and a control unit that controls the ejection section, the position changing section, and the temperature adjusting section so as to form a first shaped article and a second shaped article on the stage, wherein the control unit executes first control for shaping the first shaped article by ejecting the material from the ejection section, second control for adjusting an output of the temperature adjusting section while measuring a temperature of the first shaped article by the temperature sensor so that a viscosity of the first shaped article calculated based on the temperature of the first shaped article measured by the temperature sensor and the first relational data becomes a predetermined viscosity or less, third control for forming a first portion of the second shaped article by ejecting the material from the ejection section, and fourth control for forming a second portion that is a portion adjacent to the first portion of the second shaped article by ejecting the material from the ejection section while adjusting a temperature of the first portion by the temperature adjusting section with the output adjusted in the second control.

2. The three-dimensional shaping apparatus according to claim 1, wherein the temperature adjusting section is constituted by a heater that uniformly heats the stage.

3. The three-dimensional shaping apparatus according to claim 1, wherein the temperature adjusting section is fixed to the ejection section.

4. The three-dimensional shaping apparatus according to claim 1, wherein an outer periphery of the temperature adjusting section is placed outside a region in which the stage moves relatively with respect to the ejection section when viewed in a direction from the ejection section to the stage.

5. The three-dimensional shaping apparatus according to claim 1, wherein the storage section stores second relational data representing a relationship between the temperature of the material and a peel strength between portions formed of the material, and the control unit adjusts the output of the temperature adjusting section while measuring the temperature of the first shaped article by the temperature sensor so that the viscosity of the first shaped article calculated based on the temperature of the first shaped article measured by the temperature sensor and the first relational data becomes a predetermined viscosity or less in the second control, and the peel strength calculated based on the temperature of the first shaped article measured by the temperature sensor and the second relational data becomes a predetermined strength or more.

6. A three-dimensional shaping apparatus, comprising:

a stage;

an ejection section that ejects a molten material toward the stage;

a position changing section that changes a relative position of the stage and the ejection section;

a temperature adjusting section that adjusts a temperature of the material ejected to the stage;

a temperature sensor that measures the temperature of the material ejected to the stage;

a storage section that stores first relational data representing a relationship between the temperature of the material and a viscosity of the material; and a control unit that controls the ejection section, the position changing section, and the temperature adjusting section so as to form a shaped article on the stage, wherein the control unit executes first control for forming a first portion of the shaped article by ejecting the material from the ejection section, second control for adjusting an output of the temperature adjusting section while measuring a temperature of the first portion by the temperature sensor so that a viscosity of the first portion calculated based on the temperature of the first portion measured by the temperature sensor and the first relational data becomes a predetermined viscosity or less, and third control for forming a second portion that is a portion adjacent to the first portion of the shaped article by ejecting the material from the ejection section while adjusting the temperature of the first portion by the temperature adjusting section with the output adjusted in the second control.

* * * * *